US011600136B2

(12) United States Patent
Decasa, Jr. et al.

(10) Patent No.: US 11,600,136 B2
(45) Date of Patent: *Mar. 7, 2023

(54) SYSTEMS AND METHODS FOR ELECTRONIC GAMING WITH TRIGGER CONDITIONS

(71) Applicant: Aristocrat Technologies, Inc., Las Vegas, NV (US)

(72) Inventors: Rogelio Decasa, Jr., Renton, WA (US); Hanna Sanborn, Georgetown, TX (US); Jeffrey Uss, Liberty Hill, TX (US); Jennifer Mizzi, Round Rock, TX (US); Erick Ching, Cedar Park, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,732

(22) Filed: Sep. 20, 2021

(65) Prior Publication Data
US 2022/0005313 A1 Jan. 6, 2022

Related U.S. Application Data

(63) Continuation of application No. 16/879,338, filed on May 20, 2020, now Pat. No. 11,138,825.
(Continued)

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3258* (2013.01); *G07F 17/3267* (2013.01)

(58) Field of Classification Search
None
See application file for complete search history.

(56) References Cited

U.S. PATENT DOCUMENTS

| D392,340 S | 3/1998 | DeSimone |
| 5,882,261 A | 3/1999 | Adams |

(Continued)

FOREIGN PATENT DOCUMENTS

| EP | 1453019 A2 | 9/2004 |
| EP | 1105198 B1 | 10/2004 |

OTHER PUBLICATIONS

TwinStar J43 video slot machine cabinet, Nov. 9, 2016, CasinoJournal. com iconswebsite.com [online], [site visited Feb. 8, 2019]. Available from Internet: https://www.casinojournal.com/articles/90899-twinstar-j43-video-slot-machine-cabinetscientific-games (Year: 2016).

(Continued)

*Primary Examiner* — Jason T Yen
(74) *Attorney, Agent, or Firm* — Armstrong Teasdale LLP

(57) ABSTRACT

In one aspect, an electronic gaming system is described. The electronic gaming system includes a display device, a random number generator (RNG), a player input interface, and a game controller configured to execute instructions stored in a tangible, non-transitory, computer-readable medium. When executed by the game controller, the instructions cause the game controller to at least determine, during play of a base game, that an enhancement trigger condition is satisfied and convert the symbol displayed on each position having one of the first frame and the second frame displayed thereon into a wild symbol. The instructions further cause the game controller to determine that a bonus game trigger condition is satisfied and convert a plurality of positions on each reel with at least one position having the second frame displayed thereon, into a bonus reel. The instructions also (Continued)

cause the game controller to generate a bonus game outcome.

17 Claims, 13 Drawing Sheets

Related U.S. Application Data

(60) Provisional application No. 62/980,795, filed on Feb. 24, 2020.

(56) References Cited

U.S. PATENT DOCUMENTS

| | | | |
|---|---|---|---|
| D420,994 S | 2/2000 | Niijima | |
| D435,561 S | 12/2000 | Pettigrew | |
| 6,315,660 B1 | 11/2001 | Demar | |
| D501,213 S | 1/2005 | Totten | |
| D529,038 S | 9/2006 | Sapp | |
| D588,605 S | 3/2009 | Okada | |
| D589,972 S | 4/2009 | Casagrande | |
| D598,930 S | 8/2009 | Amos | |
| D624,933 S | 10/2010 | Fitzmaurice | |
| D678,899 S | 3/2013 | Gleasman | |
| D683,748 S | 6/2013 | Chutani | |
| D683,749 S | 6/2013 | Hally | |
| D683,750 S | 6/2013 | Hally | |
| D701,223 S | 3/2014 | Cho | |
| D711,417 S | 8/2014 | Wen | |
| D727,948 S | 4/2015 | Milliotte | |
| 9,015,286 B2 | 4/2015 | Nathan | |
| D733,181 S | 6/2015 | Manfredo | |
| D733,745 S | 7/2015 | Huang | |
| D741,879 S | 10/2015 | Chapman | |
| D749,117 S | 2/2016 | Huang | |
| D749,128 S | 2/2016 | Perez | |
| D749,633 S | 2/2016 | Perez | |
| D750,098 S | 2/2016 | Song | |
| D752,089 S | 3/2016 | Cru | |
| D754,181 S | 4/2016 | Dong | |
| D757,791 S | 5/2016 | Van Os | |
| D759,086 S | 6/2016 | Aoshima | |
| D763,894 S | 8/2016 | Lamparelli | |
| D772,240 S | 11/2016 | Edstrom | |
| D775,176 S | 12/2016 | Mitchell | |
| D778,938 S | 2/2017 | Wingate-Whyte | |
| D780,799 S | 3/2017 | Mehring | |
| D826,254 S | 8/2018 | Yuguchi | |
| D841,036 S | 2/2019 | Clediere | |
| D847,830 S | 5/2019 | Chapman | |
| 2004/0048646 A1 | 3/2004 | Visocnik | |
| 2007/0060245 A1* | 3/2007 | Veenker | G07F 17/34 463/16 |
| 2009/0291737 A1 | 11/2009 | Ajiro | |
| 2010/0048287 A1* | 2/2010 | Yoshizawa | G07F 17/32 463/20 |
| 2013/0203479 A1* | 8/2013 | Collette | G07F 17/3272 463/43 |
| 2014/0274281 A1* | 9/2014 | Jaffe | G07F 17/3213 463/20 |
| 2014/0333528 A1 | 11/2014 | Murata | |
| 2015/0074615 A1 | 3/2015 | Han | |
| 2015/0205930 A1 | 7/2015 | Shaanan | |
| 2015/0205938 A1 | 7/2015 | Dagdeviren | |
| 2015/0326625 A1 | 11/2015 | Rosenberg | |
| 2018/0225914 A1 | 8/2018 | Heenan | |
| 2018/0286183 A1* | 10/2018 | Davis | G07F 17/34 |
| 2018/0374305 A1* | 12/2018 | Davis | G07F 17/3211 |
| 2019/0019371 A1* | 1/2019 | Bolling, Jr. | G07F 17/3225 |
| 2020/0168054 A1* | 5/2020 | Berman | G07F 17/3258 |
| 2021/0248864 A1* | 8/2021 | Marks | G07F 17/3213 |

OTHER PUBLICATIONS

Notice of Allowance dated Jul. 2, 2021 for U.S. Appl. No. 16/879,338 (pp. 1-10).

* cited by examiner

SYSTEMS AND METHODS FOR ELECTRONIC GAMING WITH TRIGGER CONDITIONS

CROSS REFERENCE TO RELATED APPLICATIONS

This application claims the benefit and is a continuation of U.S. patent application Ser. No. 16/879,338, filed May 20, 2020, and entitled "SYSTEMS AND METHODS FOR ELECTRONIC GAMING WITH TRIGGER CONDITIONS" which claims the benefit of and priority to U.S. Provisional Patent Application No. 62/980,795, filed Feb. 24, 2020, and entitled "SYSTEMS AND METHODS FOR ELECTRONIC GAMING WITH TRIGGER CONDITIONS" and is related to U.S. patent application Ser. No. 29/725,289, filed Feb. 24, 2020, entitled "DISPLAY SCREEN OR PORTION THEREOF WITH A TRANSITIONAL GRAPHICAL USER INTERFACE," the disclosures of which are hereby incorporated by reference in their entireties.

TECHNICAL FIELD

The field of disclosure relates generally to electronic gaming, and more particularly, to systems and methods for providing trigger conditions during base game play.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes at least one display device, a random number generator (RNG), a player input interface configured to receive player input from a player, and a game controller configured to execute instructions stored in a tangible, non-transitory, computer-readable medium. When executed by the game controller, the instructions cause the game controller to at least determine, during play of a base game, that an enhancement trigger condition is satisfied, the enhancement trigger condition occurring when at least one of a first frame and a second frame is displayed on a position of a reel of a plurality of reels, wherein the at least one of the first frame and the second frame is displayed based at least in part on an RNG call made during play of the base game and convert, as part of a final spin of the plurality of reels in the base game, a symbol displayed on each position having one of the first frame and the second frame displayed thereon into a wild symbol. The instructions also cause the game controller to determine, upon completion of the base game, that a bonus game trigger condition is satisfied, the bonus game trigger condition occurring when at least one second frame is displayed on a position of a reel of the plurality of reels and activate, upon determining that the bonus game trigger condition is satisfied, a bonus game. The instructions further cause the game controller to convert, upon activation of the bonus game, a plurality of positions on each reel with at least one position having the second frame displayed thereon, into a bonus reel and generate a bonus game outcome based at least in part on an RNG call made during play of the bonus game, wherein the player is presented an award associated with a symbol displayed within the second frame on each bonus reel upon completion of the bonus game.

DETAILED DESCRIPTION

Figure 1:
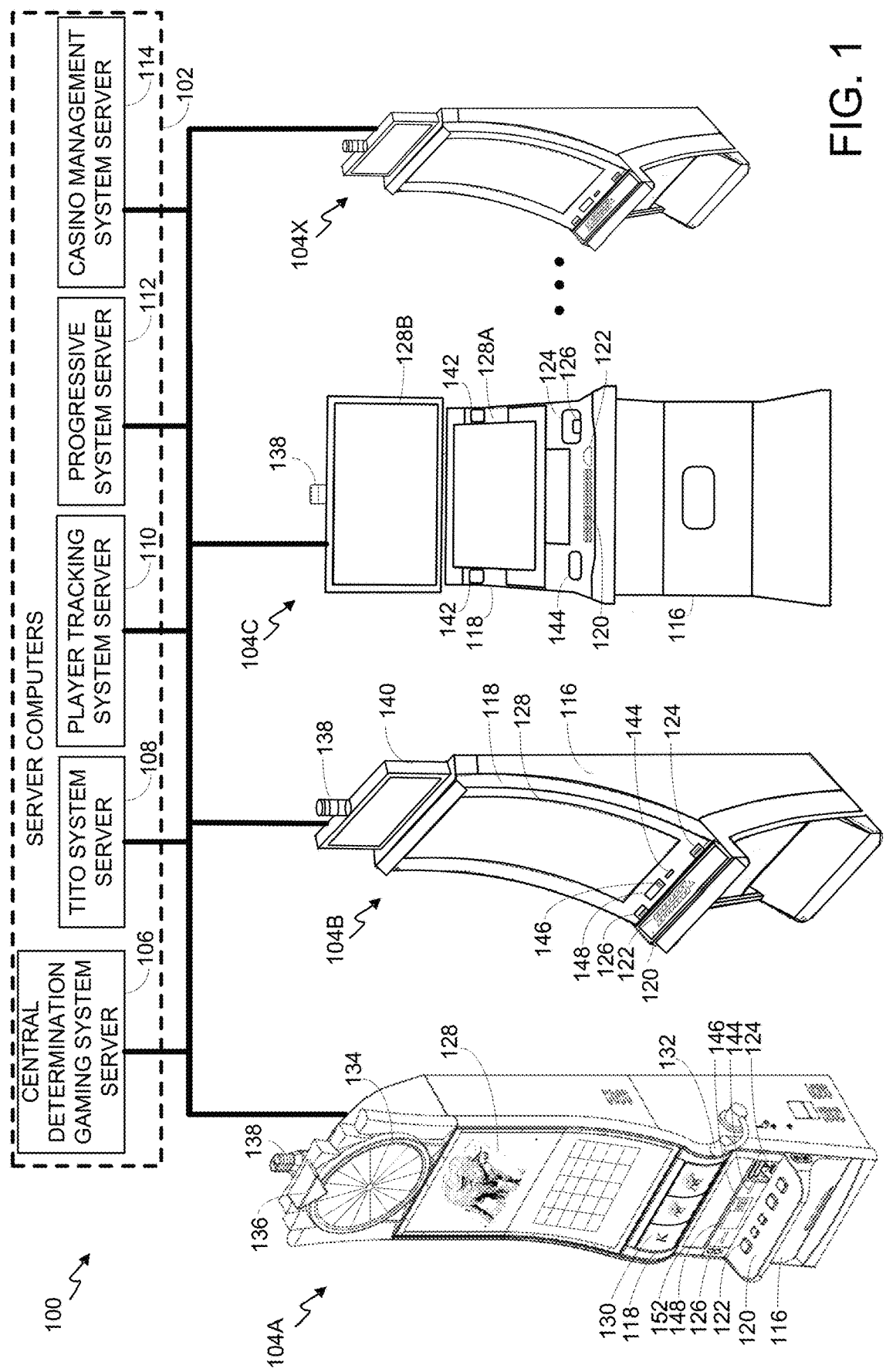
FIG. 1 is an exemplary diagram showing several EGMs networked with various gaming related servers.

Embodiments of the present disclosure provide systems and methods of providing trigger conditions during base game play. More specifically, an electronic gaming system provides an electronic game that includes a base game, a bonus game, and a feature game, wherein the bonus game and/or the feature game may be triggered during play of the base game. During play of the base game, "frames" may be awarded to a player on positions included on reels being displayed during the base game. The frames are shown around a symbol displayed on the reel, as the outline of a reel symbol position. Upon being awarded a frame at a position, the frame remains displayed at that position for the duration of the base game. In other words, in the example embodiment, the base game may include up to 10 spins such that a frame displayed on, for example spin number 3, would continue to be displayed in that position through spin 10. During the final spin of the base game, positions that include displayed frames may become populated with wild symbols (e.g., symbols that may be evaluated as any symbol, or multiple symbols, during game play). The wild symbols may appear with the word "WILD," or in some instances may be any other symbol indicating a wild symbol. The wild symbols may be used to increase the chance of a player receiving an award. Thus, at the end of the base game, the symbols including any wild symbols may be evaluated against a pay table to determine if and what award may be awarded to the player.

In the example embodiment, multiple styles of frames may be awarded to a player during play of the base game. If a frame of a certain color (e.g., a gold frame) is displayed during play of the base game, a bonus game is triggered upon completion of the base game (e.g., after the tenth spin of the base game). During the bonus game, the reel with the position having the gold frame displayed thereon is spun, and a value associated with a symbol inside of the gold frame upon completion of the spin of the reel during the bonus game is awarded to the player. In some embodiments, more than one frame may be displayed during play of the bonus game. In some embodiments, certain frames may only be eligible to appear on certain reels, for example based on an initial wager amount placed by a player.

Accordingly, the systems and methods provided herein improve display device functionality (e.g., on an EGM), by providing a plurality of visual indicators to help players understand the game mechanics described herein. The systems and methods provided herein also improve display and machine efficiency by eliminating the need for complex information pages describing game mechanics to players. Because of at least the easily understood animations, symbols, frames, and indicators displayed in the game, the game described herein can be played and understood on a device substantially smaller than some of the EGMs described herein (e.g., a mobile device such as a cell phone), thus removing the need for complex information screens including lots of text. The systems and methods described herein also improve player experiences at a gaming machine/system because the player is encouraged to stay for the full number of spins until the end of the base game so that the bonus game will be initiated. A prize is guaranteed during the bonus game, further increasing player excitement as the bonus game approaches.

The technical effects and advantages achieved by this system include at least one of: (a) displaying large quantities of complex information in a relatively small display area; (b) communicating complex information with easy-to-understand animations on a display; (c) engaging a player to finish a base game by providing indicators of bonuses that will trigger at the end of the base game; (d) increasing player excitement by guaranteeing an award during play of a bonus game and feature game; (e) displaying the number of spins played during the base game in an increasing transitional sequence; (f) clearly indicating when a player has entered a bonus game or feature game; (g) associating jackpots with reels by color to clearly indicate which jackpots and/or reels are unlocked at any given time; (h) clearly indicating when a reel and/or jackpot has been unlocked during play of the base game, feature game, and/or bonus game; (i) efficiently communicating different game rules of a base game, bonus game, and feature game to a player on a display device during gameplay; and (j) providing versatility as to which devices (e.g., EGMs, mobile devices, etc.) the games described herein may be played on because of the efficient display area designs described herein.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 2A:
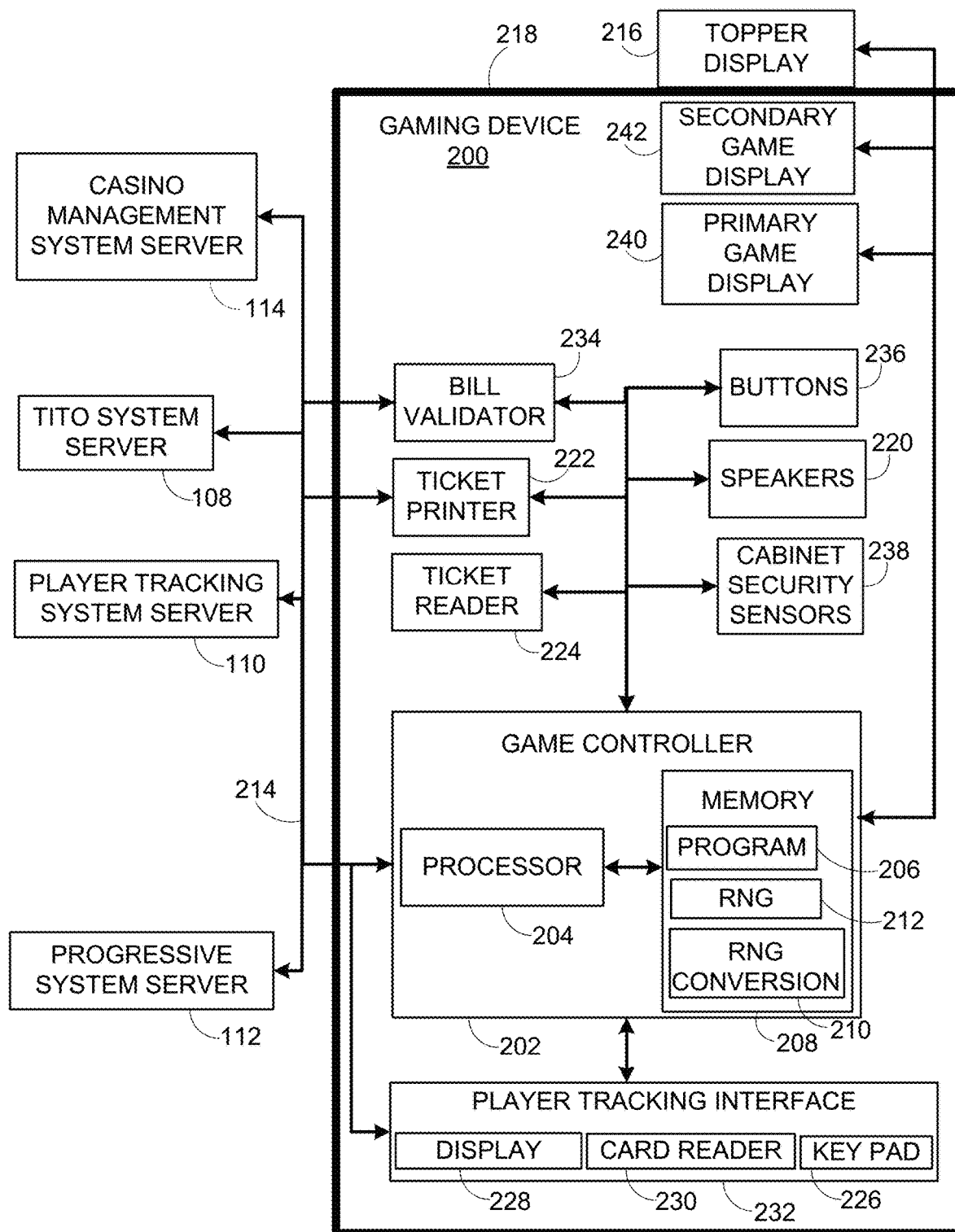
FIG. 2A is a block diagram of an example EGM that includes exemplary internal electronic components, and connections to exemplary gaming systems in accordance with the present disclosure.

FIG. 2A is a block diagram depicting exemplary internal electronic components of a gaming device 200 connected to various external systems in accordance with the present disclosure. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208. Note that embodiments of the present disclosure represent an improvement in the art of EGM software and provide new technology in that they improve display device (e.g., display 128) efficiency by visually communicating complex information to a player with animations that are easy to understand. These embodiments are thus not merely new game rules or simply a new display pattern.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2A illustrate specific embodiments of a gaming device (e.g., gaming devices 104A-104X and 200), the disclosure is not limited to those embodiments shown in FIGS. 1 and 2A. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
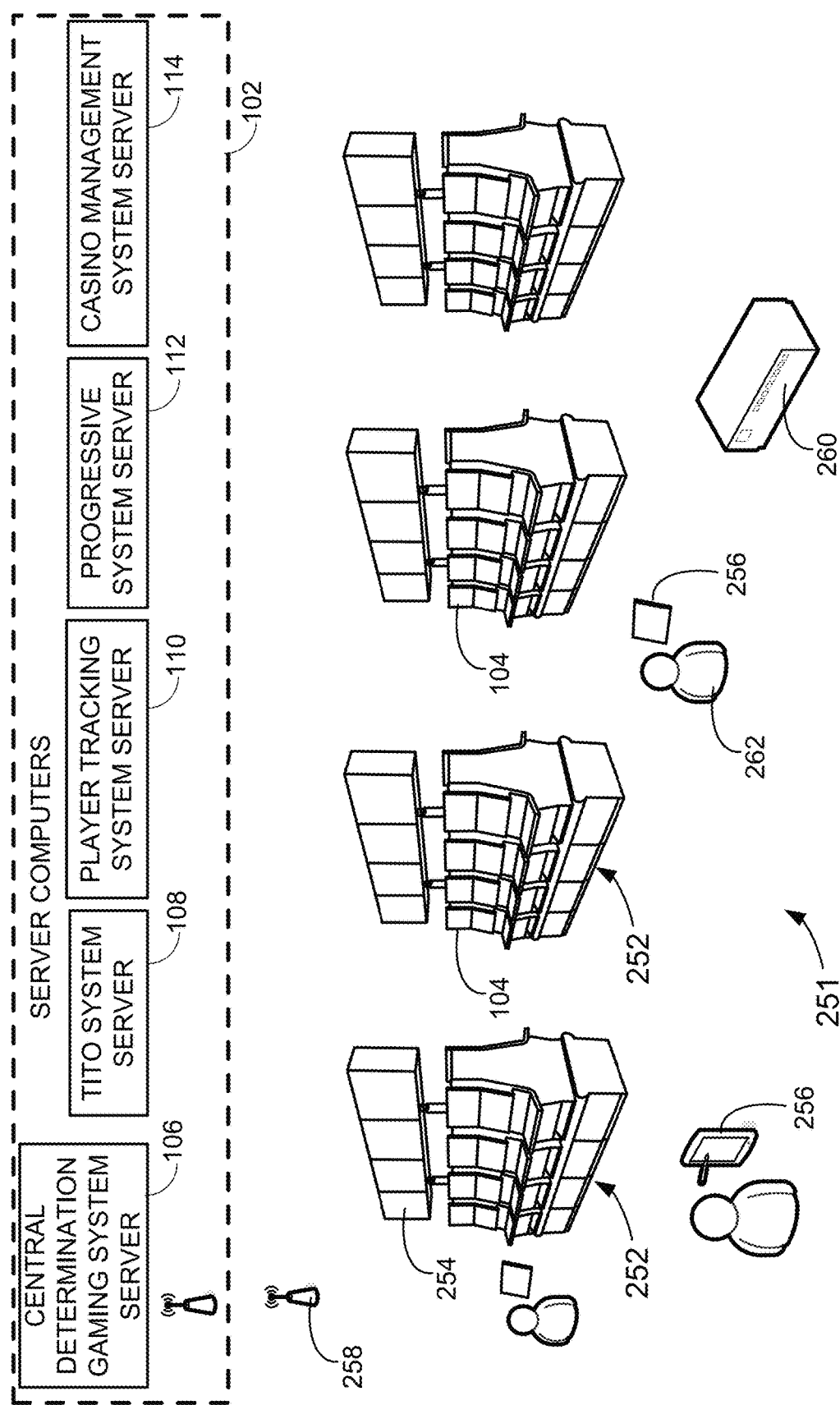
FIG. 2B depicts an example casino gaming environment in accordance with the present disclosure.

FIG. 2B depicts an example casino gaming environment in accordance with the present disclosure. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
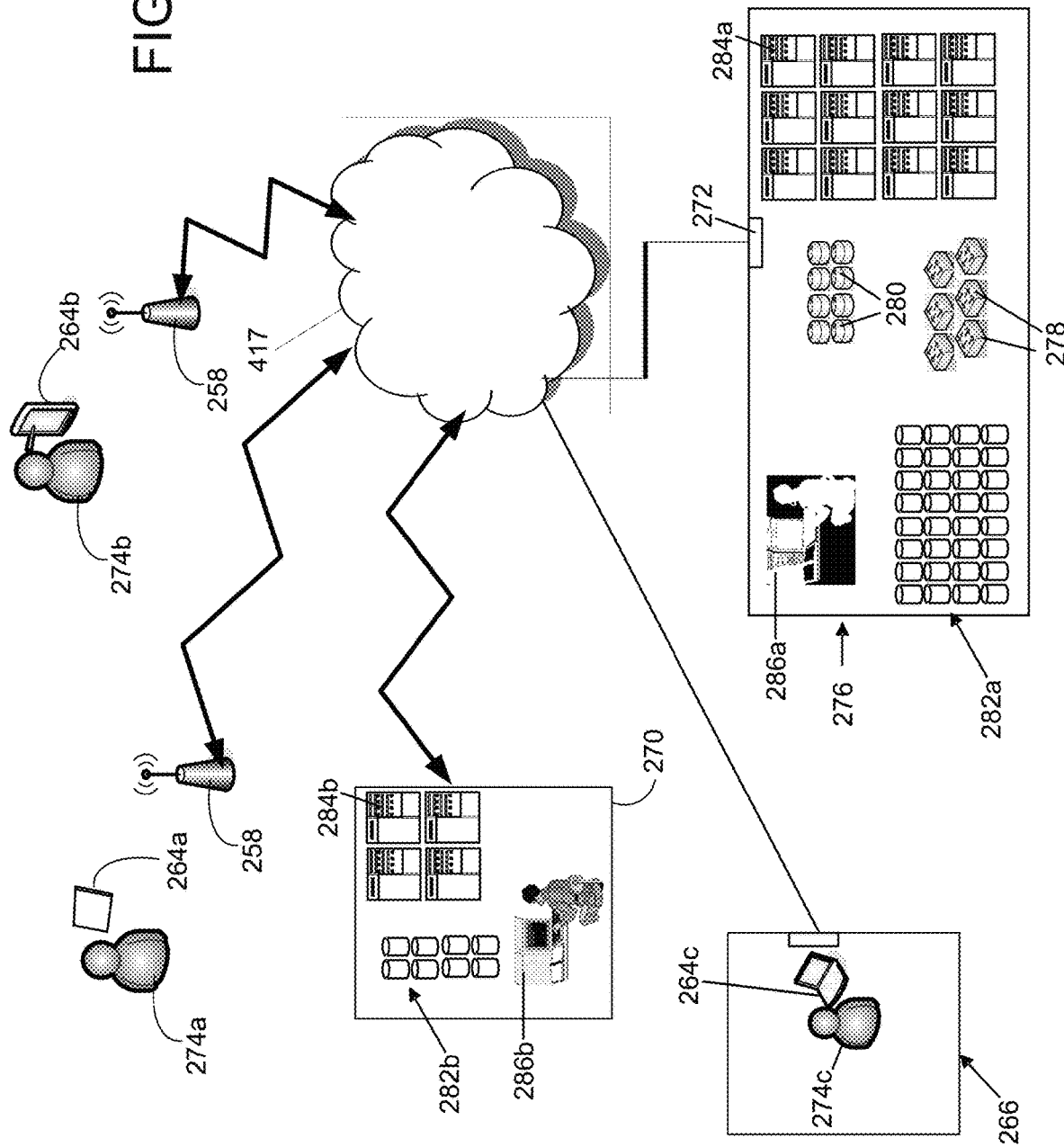
FIG. 2C is a diagram that shows examples of components of a system for providing online gaming in accordance with the present disclosure.

FIG. 2C is a diagram that shows examples of components of a system for providing online gaming in accordance with the present disclosure. As with other figures presented in this disclosure, the numbers, types and arrangements of gaming devices shown in FIG. 2C are merely shown by way of example. In this example, various gaming devices, including, but not limited to, end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations, one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
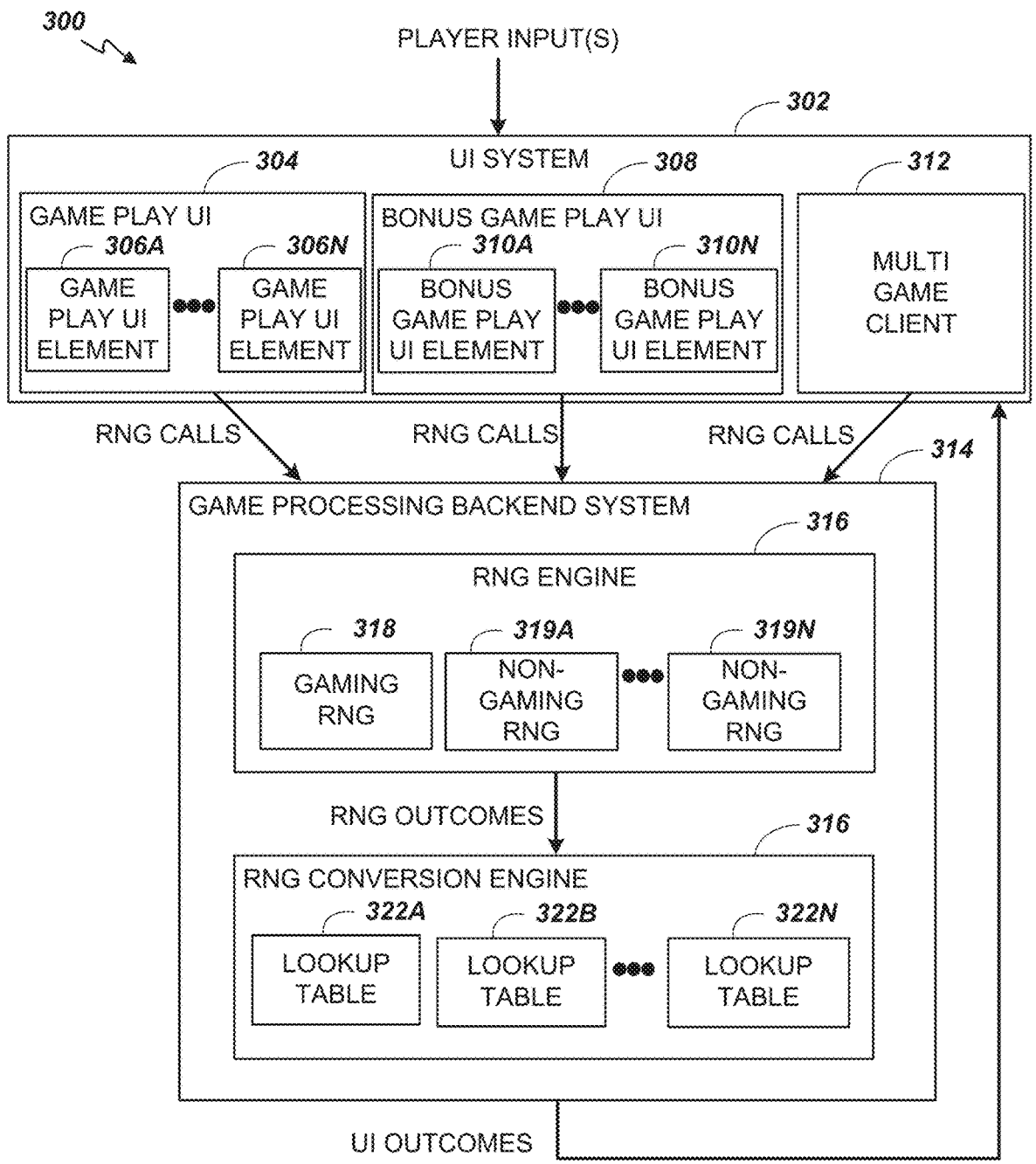
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
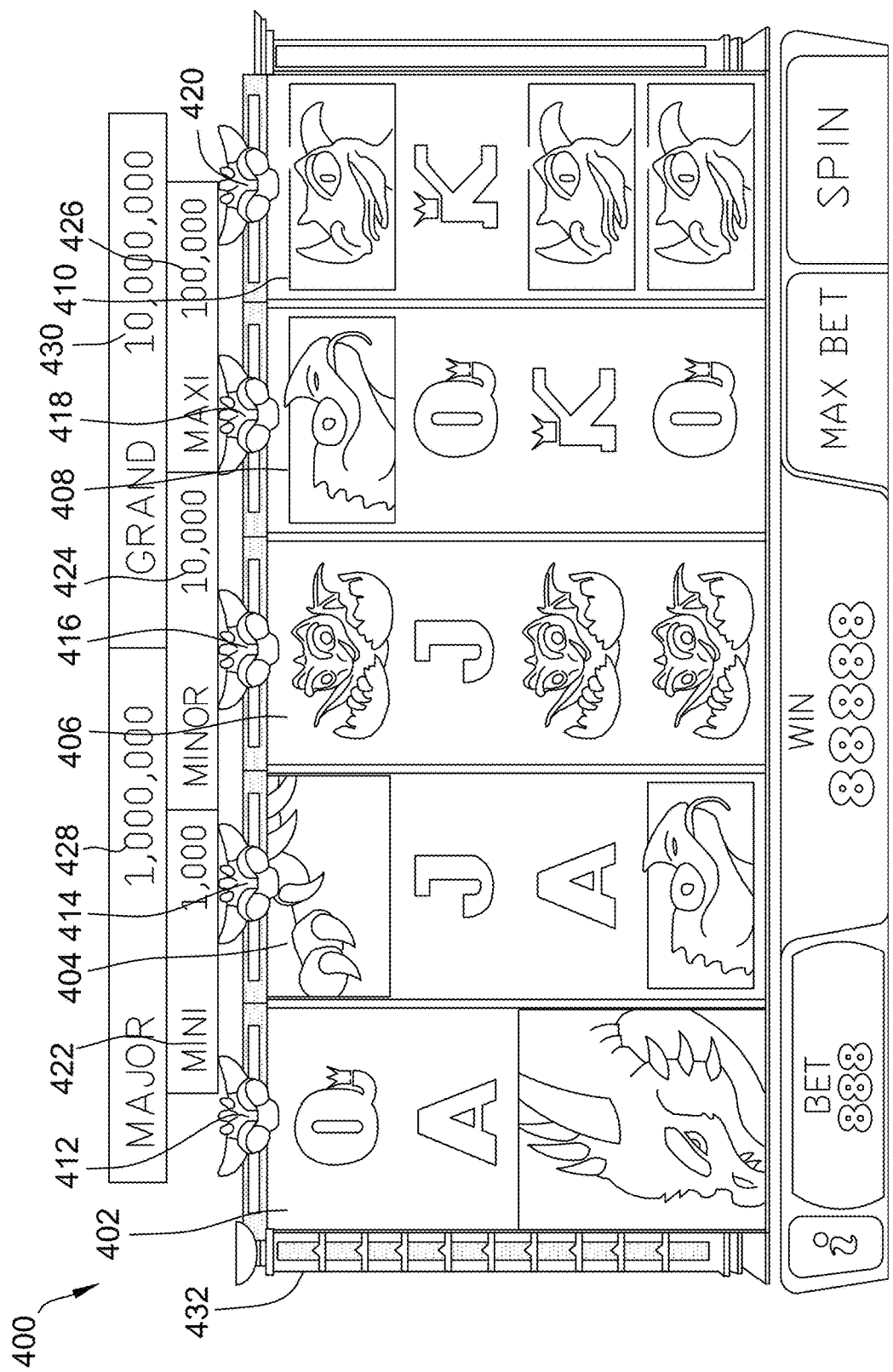
FIGS. 4-7 are example display areas displayed during a base game in accordance with the present disclosure.

FIG. 4 is an example display area 400 displayed during a base game played on an EGM on a display of a display device (e.g., display 128). Display area 400 includes a plurality of reels 402-410, a plurality of reel unlock indicators 412-420, a plurality of jackpot indicators 422-430, and a spin indicator 432.

In the example embodiment, reels 402-410 are configured to spin during play of the base game. Reel unlock indicators 412-420 are configured to indicate reels 402-410 upon which frames may appear as described herein. Reel unlock indicators 412-420 may also correspond to jackpot indicators 422-430, such that when a certain reel unlock indicator 412-420 is activated, so is a jackpot indicator 422-430. When a jackpot indicator 422-430 is unlocked (e.g., activated, or lit up), a jackpot associated with the unlocked jackpot indicator 422-430 is now eligible to be won by a player during play of the game. As examples, when jackpot indicator 422 is unlocked, a player is eligible to win a MINI jackpot. When jackpot indicator 424 is unlocked, a player is eligible to win a MINOR jackpot and the MINI jackpot, and so forth continuing to jackpot indicator 430 and a GRAND jackpot.

In some examples, when a reel unlock indicator 412-420 is activated, an associated jackpot indicator 422-430 is also activated indicating to a player that the associated activated jackpot may now be awarded on the activated reel, for example, if a jackpot award symbol corresponding to the activated jackpot were to be displayed on the activated reel during play of the base game, feature game, or bonus game. Further, reel unlock indicators 412-420 and their corresponding jackpot indicators 422-430 may match in color. For example, reel unlock indicator 412 and jackpot indicator 422 may have a blue background, reel unlock indicator 414 and jackpot indicator 424 may have a green background, and so forth. In some embodiments, the colors associated with reel unlock indicators 412-420 and jackpot indicators 422-430 are only displayed when a particular reel and/or jackpot is unlocked (e.g., causing at least one of a reel unlock indicator 412-420 and/or a jackpot indicator 422-430 to light up and display the color associated therewith). Accordingly, a player will be able to easily determine which reels and/or jackpots are unlocked at any particular time during play of the base game. Further, because the visual indicators (e.g., reel unlock indicators 412-420 and jackpot indicators 422-430) displayed in display area 400 in the example embodiment match in color, and are displayed as lit up/brighter when they are unlocked, a player can easily discern which reels are eligible to have a frame appear thereon and which jackpots are eligible to be won, regardless of the dimensions/size of a display the game is displayed on. For example, the game displayed in display area 400 could easily be played on an EGM (e.g., EGMS 104A-104X) or on a device with a much smaller display such as a display of a cell phone (e.g., EUD 264b). The color coordination and different brightness of reel unlock indicators 412-420 and jackpot indicators 422-430 allow the game to be played on devices with smaller displays as described above while still effectively communicating the same information to the player as would be communicated when the game is played on a device with a larger display.

In the example embodiment, reel unlock indicators 412-420 unlock (e.g., become activated) progressively as a wager amount from a player increases. For example, reel unlock indicator 412 may light up upon receipt of any wager amount eligible for play of the wagering game, and reel 402 would be eligible to have a frame appear thereon during play of the base game. An animation may also appear when a reel unlock indicator 412-420 is activated such as a flame shooting down onto a reel 402-410 underneath a corresponding reel unlock indicator 412-420. A player may be able to determine a reel has become active to receive a frame by other means as well, such as a sound being played (e.g., from speakers 142). Furthering the example described above, if a wager of 50,000 credits is received, reel 404 may become eligible to have a frame displayed in a position thereon, upon which reel unlock indicator 414 and jackpot indicator 424 would light up. In this example, a 120,000 credit wager may unlock reel 406 and activate reel unlock indicator 416 and jackpot indicator 426. In some embodiments, any number of credits may unlock a reel unlock indicator 412-420 and/or jackpot indicator 422-430. In some embodiments, reel unlock indicators 412-420 may not be associated with jackpot indicators 422-430. In addition to the benefits described above regarding the color coordination and brightness of reel unlock indicators 412-420 and jackpot indicators 422-430, the display of various animations to communicate information to the player (e.g., the flame animation described above) further enhances play of the game described herein on devices with relatively smaller display areas such as cell phones or tablets, as examples (e.g., EUD 264a, 264b, 264c).

During play of the base game, spin indicator 432 is configured to indicate how many spins have been completed during play of the base game, and/or if a feature game or bonus game is activated. In the example shown in FIG. 4, no spins have been completed. Accordingly, spin indicator 432 does not display a number of spins. After a spin has been completed, a portion of spin indicator 432 may light up to further indicate to a player how many spins have been completed. In the example embodiment, play of the base game includes ten spins of reels 402-410. In some embodiments, any of the games described herein, such as the base game and a feature game (see FIGS. 10 and 11), may include any number of reel spins (e.g., 2, 3, 5, 15, 20, etc.). Spin indicator 432 provides a unique enhancement of a way to communicate the number of spins already played and the number of spins remaining to a player as an increasing transitional sequence, increasing player excitement until the flame animations reach the top of spin indicator 432 and enhancements (e.g., wild symbols) are provided, as well as a potential bonus game if a trigger condition is met as described herein.

Figure 5:
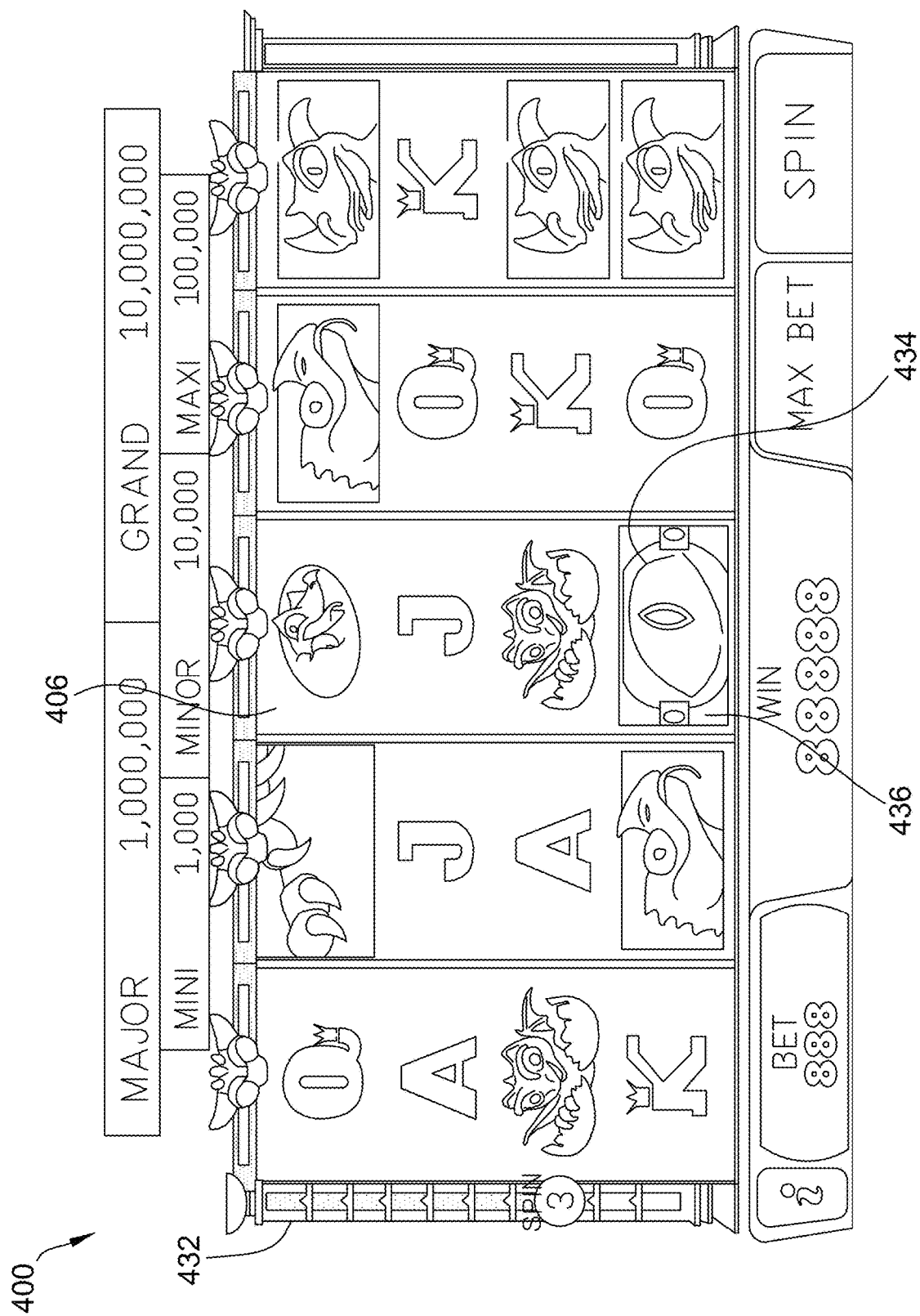

FIG. 5 is an example display area 400 displayed during a base game played on an EGM on a display of a display device after three spins of reels 402-410 have been completed during play of the base game. Accordingly, spin indicator 432 displays "Spin 3" and three portions of spin indicator 432 have been lit up to further indicate to a player that three spins have been completed.

Further, a base game frame 436 is displayed on a fourth (e.g., bottom) location of reel 406. Upon a first symbol 434 (e.g., a base game trigger symbol) appearing in the base game, a base game frame 436 is displayed on the positions where first symbol 434 appeared. Frame 436 will remain in that location for the remainder of the base game, and potentially other games resulting from the base game (e.g., a bonus game or a feature game). On the final spin of the base game, in this example the tenth spin, reel locations with a frame thereon may become wild (e.g., displaying wild symbols that may be evaluated as any symbol, or multiple symbols as described above). Thus, upon a frame being displayed during play of the base game, a player is encouraged to keep playing until the final spin of the base game when the location with the frame thereon will become wild. Accordingly, excitement of players will increase as a final spin of the base game approaches and any location with base game frame 436 thereon will become wild, thus increasing a potential award to be presented to the player because a wild symbol may be evaluated as any symbol as described herein.

Figure 6:
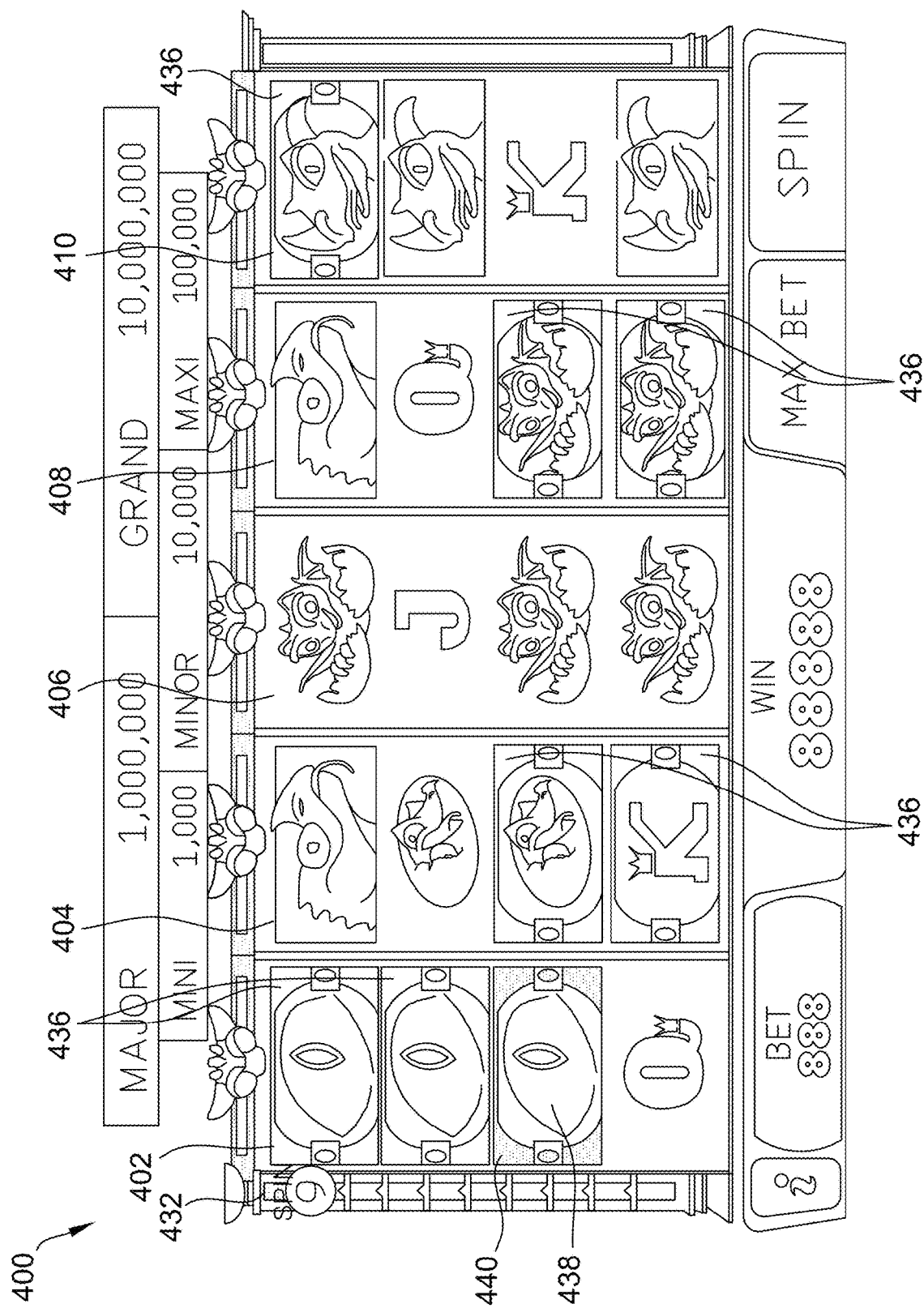

FIG. 6 is an example display area 400 displayed during a base game played on an EGM on a display of a display device after nine spins of reels 402-410 have been completed during play of the base game. Accordingly, spin indicator 432 displays "Spin 9" and nine portions of spin indicator 432 have been lit up to further indicate to a player that nine spins have been completed.

Further, a bonus game frame 440 is displayed on a third location (e.g., third location from the top) of reel 402. Upon bonus game symbol 438 (e.g., a bonus game trigger symbol) being displayed during play of the base game, bonus game frame 440 is displayed on the location where bonus game symbol 438 appears. Frame 440 will remain in that location for at least the remainder of the base game. In the example embodiment, first symbol 434 and bonus game symbol 438 are similar (e.g., dragon eyes), but of different colors (e.g., silver and gold). In some embodiments, first symbol 434 and bonus game symbol 438 may be different images, or different in any number of ways. In the example embodiment, base game frame 436 and bonus game frame 440 are similar, but of different colors (e.g., silver and gold). In some embodiments, base game frame 436 and bonus game frame 440 may be different images, or different in any number of ways. In the example embodiment, upon bonus game frame 440 being displayed on reel 402, reel unlock indicator 412 may transition in color (e.g. from silver to gold) to indicate to the player that, during the bonus game, reel 402 will be converted into a bonus game reel. Display of frames 436, 440 provides another example of how the animations described herein effectively communicate information to a player. As an example, when a frame is initially displayed, it may at first appear larger than is shown in FIG. 6 to attract player attention to the frame 436, 440. Then, after a predetermined amount of time and before a next spin, frame 436, 440 may shrink down to the size shown in FIG. 6 so that it is displayed in the proper position.

In the example embodiment, display of frame 440 indicates that a bonus game will be triggered upon completion (e.g., a final spin) of the base game. Although base game frame 436 and bonus game frame 440 are described as frames herein, it should be noted that different indicators may be displayed on locations of reels other than frames to indicate trigger conditions that have been or will be satisfied (e.g., locations could appear darker or lighter, could contain indicator symbols such as flames, etc.). Accordingly, display of base game frame 436 and/or bonus game frame 440 provides further excitement for a player to complete the base game so that symbols within frames 436, 440 turn wild for a final spin of the base game, and if a bonus game frame 440 is displayed, a bonus game is triggered after the final spin of the base game.

Figure 7:
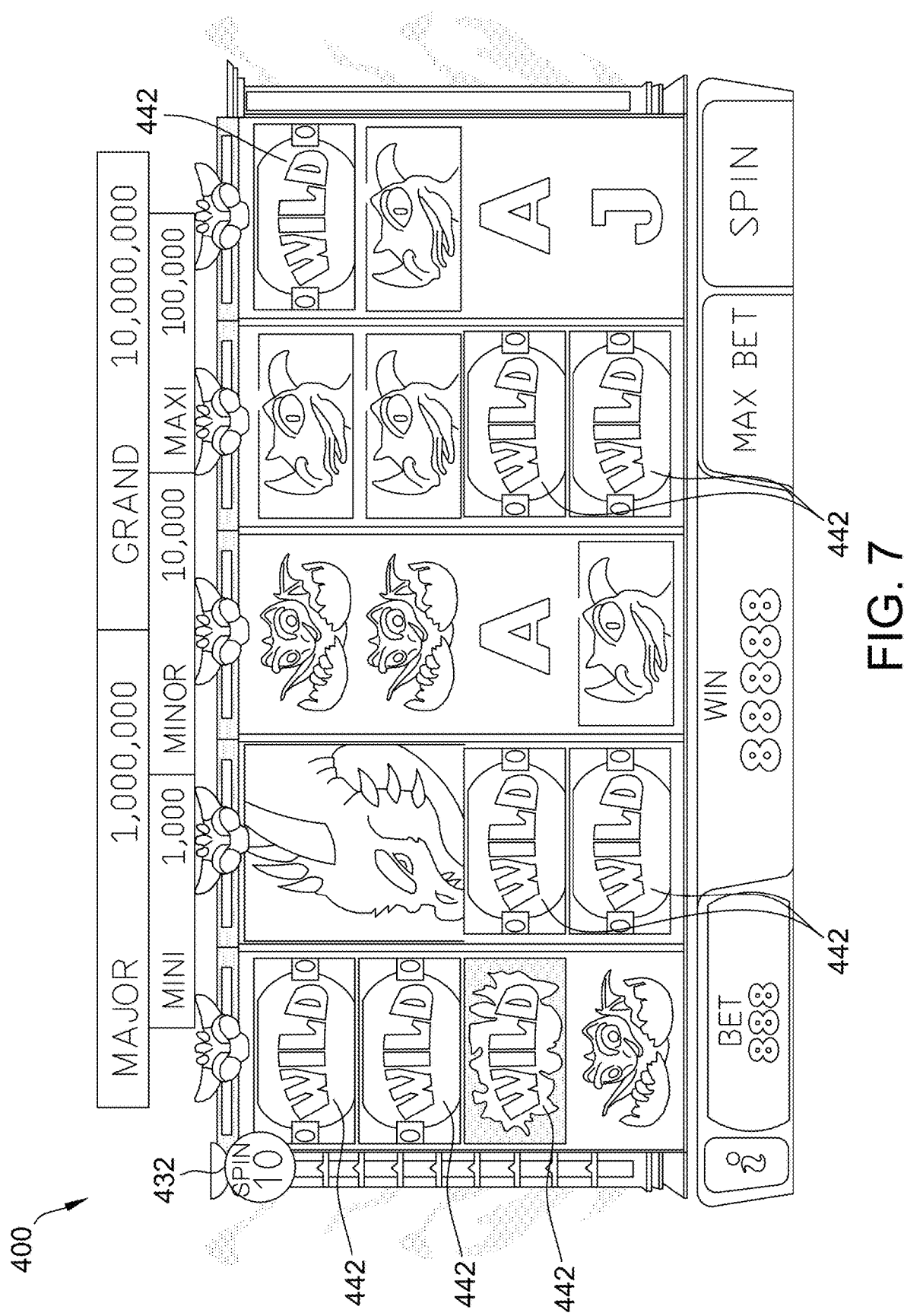

FIG. 7 is an example display area 400 displayed during a base game played on an EGM on a display of a display device after ten spins of reels 402-410 have been completed during play of the base game. As was described above, positions of reels 402-410 having frames displayed thereon have been converted to display wild symbols 442 during the tenth spin of the base game. Accordingly, because of display of wild symbols 442, the player has a greater chance of winning an award. To further increase player excitement, more flames appear on the outside of spin indicator 432 and reel 410 to communicate a higher chance of a player winning a prize because of the plurality of wild symbols 442 now being displayed on reels 402, 404, 408, and 410.

Figure 8:
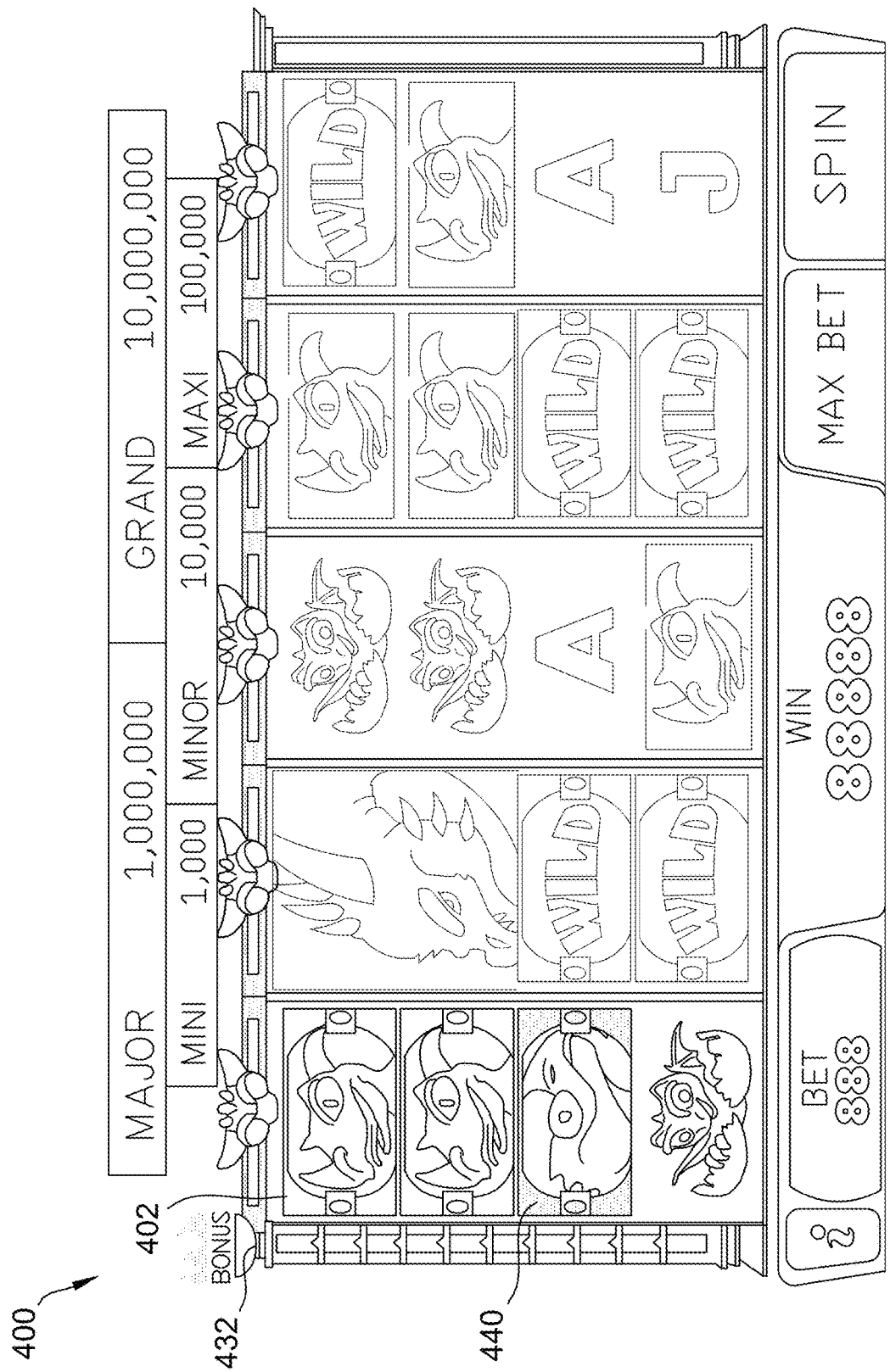
FIGS. 8 and 9 are example display areas displayed during a bonus game in accordance with the present disclosure.

FIG. 8 is an example display area 400 displayed during a bonus game played on an EGM on a display of a display device after the base game has been completed. Accordingly, spin indicator 432 displays "BONUS" to indicate the bonus game will be played during the next spin. Because bonus game frame 440 being displayed triggered the bonus game, only reel 402, with bonus game frame 440 displayed thereon, is active during the bonus game. In some embodiments reels may include more than one bonus game frame 440. In some embodiments, more than one reel may be active during the bonus game and have at least one bonus game frame 440 thereon.

Figure 9:
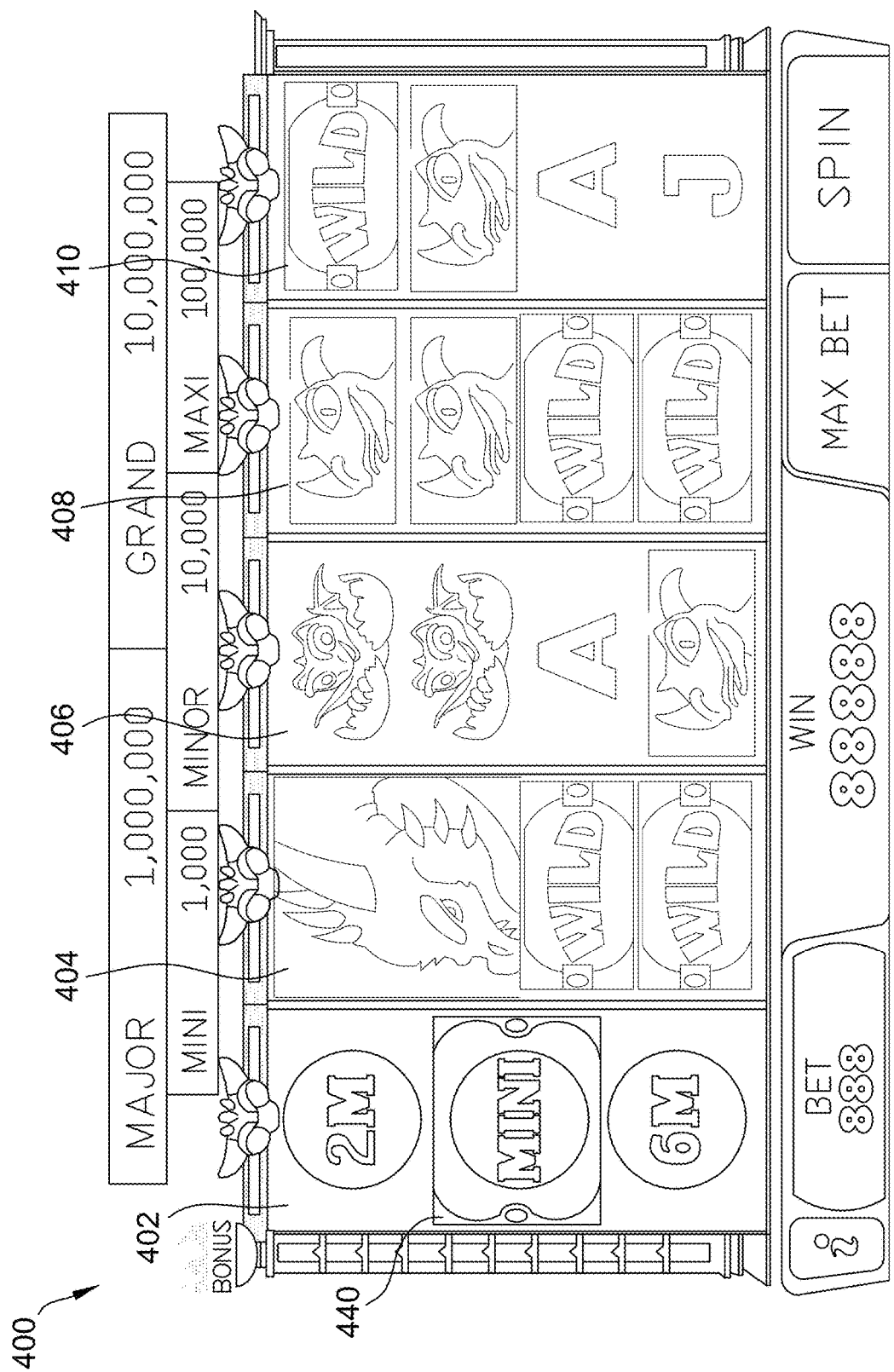

FIG. 9 is an example display area 400 displayed during a bonus game played on an EGM on a display of a display device after a spin during the bonus game has been completed and reel 402 is converted into a bonus game reel. In the embodiment shown in FIG. 9, reel 402 is converted into a bonus game reel displaying three rows instead of four and bonus game frame 440 is moved to the middle of reel 402. Centering bonus game frame 440 in the middle of reel 402 makes it easier for a player to track their potential prize during a bonus game, and further focuses the player on the bonus game. In some embodiments bonus game frame 440 may change in size (e.g., taking up more than one location, possibly on more than one reel 402-410) to further attract player attention. In some embodiments, bonus game frame 440 may change in appearance during play of the bonus game. In some embodiments, bonus game frame 440 may expand and glow to attract player attention to bonus game frame 440. In the example embodiments, all symbols in the bonus reel are associated with a prize. Accordingly, a player is guaranteed to win a prize upon entering the bonus game because a symbol associated with a prize will be displayed within bonus game frame 440. Guaranteeing of a prize in the bonus game further increases player excitement and enjoyment while playing the game.

In the embodiment shown in FIG. 9, a MINI symbol appears inside bonus game frame 440. Thus, the player has won a MINI jackpot (e.g., as shown in jackpot indicator 422). Notably, the first and third locations of reel 402 (e.g., the top and bottom positions) also contain prize values. In some embodiments, a player may be awarded with all prize values displayed on a reel 402-410 during play of the bonus game, and not just the prize displayed within a bonus game frame.

Figure 10:
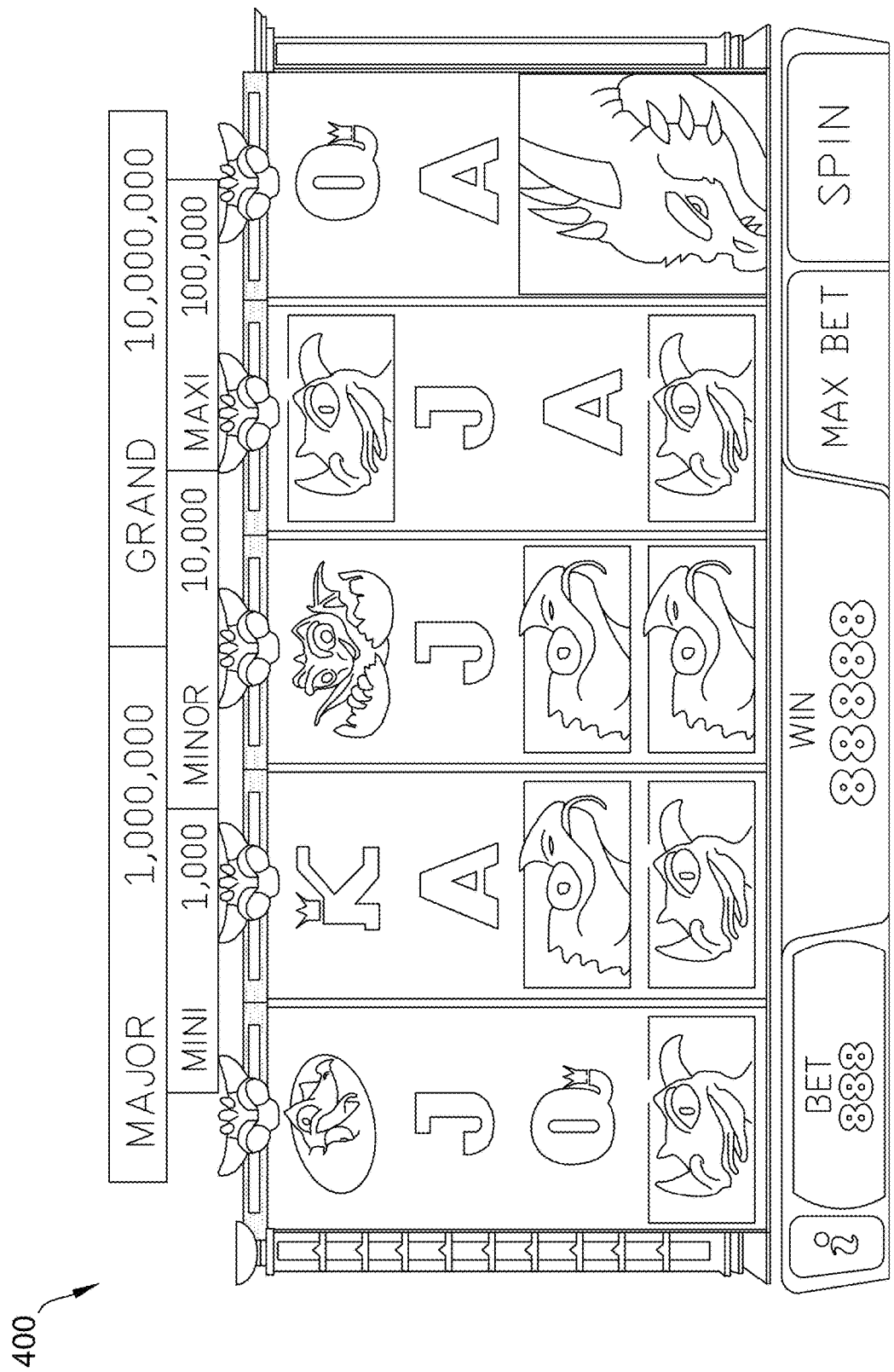
FIGS. 10 and 11 are example display areas displayed during a feature game in accordance with the present disclosure.

FIG. 10 is an example display area 400 displayed during a feature game played on an EGM on a display of a display device once the feature game has been activated. In the example embodiment, the feature game is activated upon at least three feature game symbols appearing during play of the base game. In some embodiments, other triggers during play of the base game may activate the feature game. Upon completion of the feature game, game play is switched back to play of the base game based on when the feature game was activated. For example, if the feature game was triggered on a third spin of the base game, the next spin of the base game after returning from the feature game would be a fourth spin of the base game.

Ten free games (e.g., ten free spins of the feature game) are awarded in the feature game in the example embodiment. Bonus game frame 440 and/or base game frame 436 may be displayed in the feature game similar to the way they are displayed as described above in the base game. As was described above with respect to the base game, in the example embodiment of the feature game, locations displaying a bonus game frame 440 or base game frame 436 during the final spin of the feature game may display wild symbols such that a player has a higher chance of receiving an award on the tenth spin. Further, display of at least one bonus game frame 440 may trigger a bonus game upon completion of the feature game.

Figure 11:
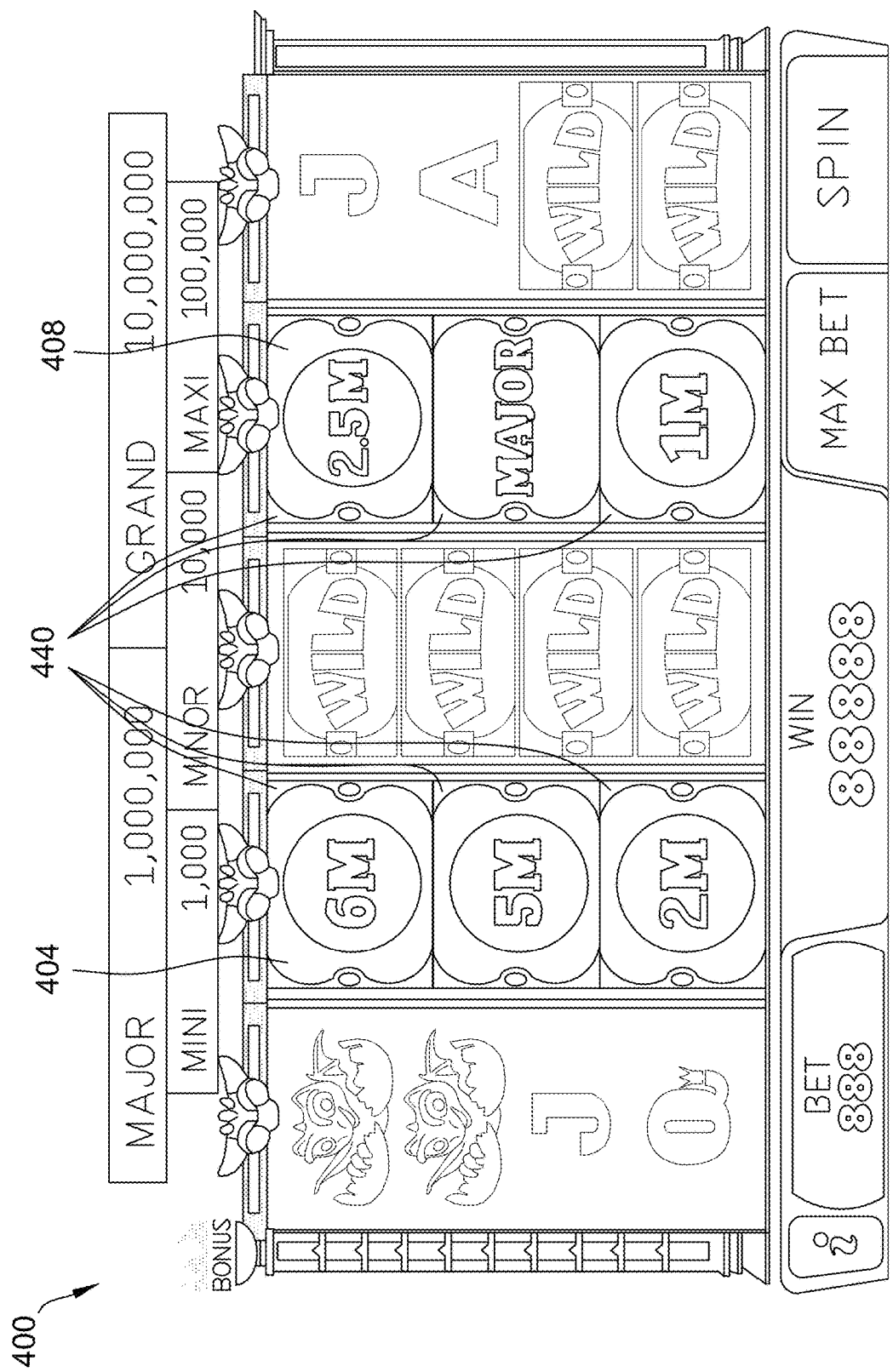

FIG. 11 is an example display area 400 displayed during a bonus game triggered from a feature game played on an EGM on a display of a display device. In the example embodiment shown in FIG. 11, at least one bonus game frame 440 was displayed on each of reel 404 and reel 408 during play of the feature game. Accordingly reel 404 and reel 408, having at least one bonus game frame 440 displayed thereon, are active during play of the bonus game. Further, in the example embodiment each symbol location of each reel that is active during play of the bonus game has bonus game frame 440 displayed thereon. Display of bonus game frame 440 at each symbol location of each reel active during the bonus game indicates to the player that each award displayed at symbol locations of active reels (e.g., within bonus game frame 440) during play of the bonus game triggered from the feature game will be awarded. In other words, in the example embodiment, a bonus game triggered by the feature game awards a player with each award displayed on an active reel during the bonus game, as opposed to a single award displayed within bonus game frame 440 on each reel as was described above with respect to the bonus game triggered from the base game.

In some embodiments, when unlocking a reel unlock indicator 412-420, a jackpot indicator 422-430, or entering the bonus game or feature game as described herein, an overlay (e.g., a reel unlock animation) may be displayed over at least a portion of reels 402-410 describing the respective gameplay aspect. For example when unlocking reel unlock indicator 414 and jackpot indicator 424, a flame may appear in reel 404 including text such as "MINOR unlocked." When unlocking reel unlock indicator 416 and jackpot indicator 426, a flame may appear in reel 406 including text such as "MAXI unlocked," and so forth when remaining reel unlock indicators 418, 420 and jackpot indicators 428 and 430 become unlocked.

Similarly, when entering the feature game, an overlay may appear over at least portions of reels 402-410 displaying an explanation to the player that the feature game will begin shortly (e.g., "FREE GAMES AWARDED"). The overlay may also display an explanation of mechanics of the feature game, such as an explanation that if a bonus game is triggered after the feature game is complete, a player will be awarded with the values appearing in every location of reels that are used in the bonus game (e.g., all three locations of a reel). Similar overlays may appear when entering the bonus game from the base game, as was described above.

In some embodiments, multiple bonus game frames 440 may be required to be displayed on a reel 402-410 to trigger the bonus game described herein. In some embodiments, bonus game frames 440 may need to be displayed in particular locations on a reel 402-410 in order to trigger the bonus game described herein. In some embodiments, a bonus game frame 440 being displayed on a position of a reel 402-410 may trigger an additional game. In the additional game, the locations having bonus game frame 440 displayed thereon may be enhanced locations during play of the additional game (e.g., including a wild symbol, a multiplier, and/or a value such as a jackpot value). In some embodiments, locations with bonus game frame 440 and/or base game frame 436 displayed thereon may provide bonuses during play of the base game (e.g., a wild symbol may be displayed therein).

In some embodiments, a single bonus game symbol 438 may affect multiple locations on potentially multiple reels 402-410, thus triggering multiple reels 402-410 for play of the bonus game as described herein. In some embodiments, a certain number of symbols 434/438 and/or frames 436/440 being displayed may trigger a jackpot (e.g., MINI, MINOR, etc.). In some embodiments, reels active during the bonus game and/or feature game may be expanded reels (e.g., having more rows displayed than during the base game). In some embodiments, at least some of frames 436/440 displayed during play of a base game may persist into future plays of the base game instead of resetting after, as examples, a bonus game or tenth spin of the base game. In some embodiments, wild symbols as described herein may include expanding wild symbols, exploding wild symbols, and/or random wild symbols.

In one aspect, an electronic gaming system is described. The electronic gaming system includes at least one display device, a random number generator (RNG), a player input interface configured to receive player input from a player, and a game controller configured to execute instructions stored in a tangible, non-transitory, computer-readable medium. When executed by the game controller, the instructions cause the game controller to at least determine, during play of a base game, that an enhancement trigger condition is satisfied, the enhancement trigger condition occurring when at least one of a first frame and a second frame is displayed on a position of a reel of a plurality of reels, wherein the at least one of the first frame and the second frame is displayed based at least in part on an RNG call made during play of the base game and convert, as part of a final spin of the plurality of reels in the base game, a symbol displayed on each position having one of the first frame and the second frame displayed thereon into a wild symbol. The instructions also cause the game controller to determine, upon completion of the base game, that a bonus game trigger condition is satisfied, the bonus game trigger condition occurring when at least one second frame is displayed on a position of a reel of the plurality of reels and activate, upon determining that the bonus game trigger condition is satisfied, a bonus game. The instructions further cause the game controller to convert, upon activation of the bonus game, a plurality of positions on each reel with at least one position having the second frame displayed thereon, into a bonus reel and generate a bonus game outcome based at least in part on an RNG call made during play of the bonus game, wherein the player is presented an award associated with a symbol displayed within the second frame on each bonus reel upon completion of the bonus game.

In some embodiments, the electronic gaming system may cause the game controller to cause a reel unlock indicator to be displayed for at least one reel of the plurality of reels, wherein the reel unlock indicator indicates that the at least one reel is unlocked as eligible to have the first frame and second frame displayed thereon, further cause the game controller to unlock a reel of the plurality of reels to be eligible to have the first frame and the second frame displayed thereon based at least in part on a wager amount placed by a player wherein a different wager amount is required to unlock each different reel of the plurality of reels to be eligible to have the first frame and the second frame displayed thereon and wherein the different wager amounts required to unlock each different reel of the plurality of reels increase sequentially from a wager amount required to unlock a leftmost reel of the plurality of reels to a wager amount required to unlock a rightmost reel of the plurality of reels.

In some embodiments of the electronic gaming system, when a reel of the plurality of reels becomes unlocked as eligible to have the first frame and the second frame displayed thereon, the instructions further cause the game controller to cause display of a reel unlock animation on the reel that becomes unlocked. In some embodiments of the electronic gaming system, each reel unlock indicator includes a color associated therewith and the instructions further cause the game controller to cause display, when a reel of the plurality of reels is unlocked as eligible to have the first frame and the second frame displayed thereon, of the color associated with the reel unlock indicator for the unlocked reel on the reel unlock indicator wherein display of the at least one of the first frame and the second frame, the reel unlock indicator, the reel unlock animation, and the color associated with the reel unlock indicator communicates information to a player of the base game and the bonus game, wherein the player is interacting with the at least one display device and the at least one display device includes a limited display area.

In some embodiments of the electronic gaming system, the instructions further cause the game controller to cause at least one jackpot indicator to be displayed, wherein the at least one jackpot indicator indicates that a jackpot associated with the at least one jackpot indicator is unlocked as eligible to be awarded to a player wherein the instructions further cause the game controller to unlock the jackpot as eligible to be awarded to the player based at least in part on a wager amount placed by the player. Yet further, in some embodiments, a different wager amount is required to unlock each different jackpot of a plurality of jackpots wherein each different wager amount required to unlock each different jackpot of the plurality of jackpots increases sequentially from a wager amount required to unlock a lowest value jackpot to a wager amount required to unlock a highest value jackpot.

In some embodiments of the electronic gaming system, each jackpot indicator of a plurality of jackpot indicators includes a color associated therewith wherein the instructions further cause the game controller to cause display, when a jackpot of the plurality of jackpots is unlocked as eligible to be awarded to the player, of the color associated with the jackpot indicator for the unlocked jackpot on the jackpot indicator and wherein display of at least one of the first frame and the second frame, the jackpot indicator, the jackpot unlock animation, and the color associated with the jackpot indicator communicates information to a player of the base game and the bonus game wherein the player is interacting with the at least one display device and the at least one display device includes a limited display area.

In some embodiments of the electronic gaming system, when a jackpot becomes unlocked as eligible to be awarded to the player, the instructions further cause the game controller to cause display of a jackpot unlock animation indicating the jackpot has become unlocked as eligible to be awarded to the player.

In some embodiments of the electronic gaming system the first frame includes a first color and the second frame includes a second color. In some embodiments, the instructions further cause the game controller to cause to be displayed the first frame at a position of a reel of the plurality of reels upon a first trigger symbol being displayed at the position of the reel of the plurality of reels. In some embodiments, the instructions further cause the game controller to cause to be displayed the second frame at a position of a reel of the plurality of reels upon a second trigger symbol being displayed at the position of the reel of the plurality of reels.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:
   at least one display device;
   a player input interface configured to receive player input from a player;
   a game controller configured to execute instructions stored in a memory, wherein the instructions, when executed by the game controller, cause the game controller to:
   cause a reel unlock indicator to be displayed for at least one reel of a plurality of reels, wherein the reel unlock indicator indicates that the at least one reel is unlocked as eligible to have a frame displayed thereon;
   determine, during play of a base game, that an enhancement trigger condition is satisfied, the enhancement trigger condition occurring when the frame is displayed on at least one position of a reel of the plurality of reels on the at least one display device;
   convert a symbol displayed on each position having the frame displayed thereon into a wild symbol;
   determine, upon completion of the base game, that a bonus game trigger condition is satisfied, the bonus game trigger condition occurring when the frame is displayed;
   convert, upon activation of a bonus game, a plurality of positions on each reel with at least one position having the frame displayed thereon, into a bonus reel; and
   generate a bonus game outcome, wherein the bonus game outcome is associated with a symbol displayed within each frame on each bonus reel and provides a contribution toward a target level of return to player (RTP).

2. The electronic gaming system of claim 1, wherein the frame comprises at least one of a first frame or a second frame different from the first frame.

3. The electronic gaming system of claim 1, wherein the instructions further cause the game controller to unlock the at least one reel of the plurality of reels to be eligible to have the frame displayed thereon based at least in part on an input amount received from the player.

4. The electronic gaming system of claim 1, wherein when the at least one reel of the plurality of reels becomes unlocked as eligible to have the frame displayed thereon, the instructions further cause the game controller to cause display of a reel unlock animation on the at least one reel that becomes unlocked.

5. The electronic gaming system of claim 1, wherein the instructions further cause the game controller to cause at least one jackpot indicator to be displayed, wherein the at least one jackpot indicator indicates that a jackpot associated with the at least one jackpot indicator is unlocked as eligible to be awarded to a player.

6. The electronic gaming system of claim 5, wherein the instructions further cause the game controller to unlock the jackpot as eligible to be awarded to the player based at least in part on an input amount received from the player.

7. A non-transitory, computer-readable storage medium having instructions stored thereon which, in response to execution by a processor, cause the processor to:
   cause a reel unlock indicator to be displayed for at least one reel of a plurality of reels, wherein the reel unlock indicator indicates that the at least one reel is unlocked as eligible to have a frame displayed thereon;
   determine, during play of a base game, that an enhancement trigger condition is satisfied, the enhancement trigger condition occurring when the frame is displayed on at least one position of a reel of the plurality of reels on a display device;
   convert a symbol displayed on each position having the frame displayed thereon into a wild symbol;
   determine, upon completion of the base game, that a bonus game trigger condition is satisfied, the bonus game trigger condition occurring when the frame is displayed;

convert, upon activation of a bonus game, a plurality of positions on each reel with at least one position having the frame displayed thereon, into a bonus reel; and generate a bonus game outcome, wherein the bonus game outcome is associated with a symbol displayed within each frame on each bonus reel and provides a contribution toward a target level of return to player (RTP).

8. The non-transitory, computer-readable storage medium of claim 7, wherein the frame comprises at least one of a first frame or a second frame different from the first frame.

9. The non-transitory, computer-readable storage medium of claim 7, wherein the instructions further cause the processor to unlock the at least one reel of the plurality of reels to be eligible to have the frame displayed thereon based at least in part on an input amount received from a player.

10. The non-transitory, computer-readable storage medium of claim 7, wherein when the at least one reel of the plurality of reels becomes unlocked as eligible to have the frame displayed thereon, the instructions further cause the processor to cause display of a reel unlock animation on the at least one reel that becomes unlocked.

11. The non-transitory, computer-readable storage medium of claim 7, wherein the instructions further cause the processor to cause at least one jackpot indicator to be displayed, wherein the at least one jackpot indicator indicates that a jackpot associated with the at least one jackpot indicator is unlocked as eligible to be awarded to a player.

12. The non-transitory, computer-readable storage medium of claim 11, wherein the instructions further cause the processor to unlock the jackpot as eligible to be awarded to the player based at least in part on an input amount received from the player.

13. A method of electronic gaming implemented by a processor in communication with a memory, the method comprising:

causing, by the processor, a reel unlock indicator to be displayed for at least one reel of a plurality of reels, wherein the reel unlock indicator indicates that the at least one reel is unlocked as eligible to have a frame displayed thereon;

determining, by the processor during play of a base game, that an enhancement trigger condition is satisfied, the enhancement trigger condition occurring when the frame is displayed on at least one position of a reel of the plurality of reels on a display device;

converting, by the processor, a symbol displayed on each position having the frame displayed thereon into a wild symbol;

determining, by the processor upon completion of the base game, that a bonus game trigger condition is satisfied, the bonus game trigger condition occurring when the frame is displayed;

converting, by the processor upon activation of a bonus game, a plurality of positions on each reel with at least one position having the frame displayed thereon, into a bonus reel; and generating, by the processor, a bonus game outcome, wherein the bonus game outcome is associated with a symbol displayed within each frame on each bonus reel and provides a contribution toward a target level of return to player (RTP).

14. The method of claim 13, wherein the frame comprises at least one of a first frame or a second frame different from the first frame.

15. The method of claim 13, further comprising causing unlocking, by the processor, of the at least one reel of the plurality of reels to be eligible to have the frame displayed thereon based at least in part on an input amount received from a player.

16. The method of claim 13, wherein when the at least one reel of the plurality of reels becomes unlocked as eligible to have the frame displayed thereon, the method further comprises causing display of a reel unlock animation on the at least one reel that becomes unlocked.

17. The method of claim 13, further comprising causing at least one jackpot indicator to be displayed, wherein the at least one jackpot indicator indicates that a jackpot associated with the at least one jackpot indicator is unlocked as eligible to be awarded to a player.

* * * * *